US011886420B2

(12) United States Patent
Sewell et al.

(10) Patent No.: US 11,886,420 B2
(45) Date of Patent: Jan. 30, 2024

(54) SYSTEM AND METHOD FOR DISTRIBUTING DATA RECORDS USING A BLOCKCHAIN

(71) Applicant: nChain Licensing AG, Zug (CH)

(72) Inventors: Martin Sewell, London (GB); Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 683 days.

(21) Appl. No.: 16/604,539

(22) PCT Filed: Apr. 10, 2018

(86) PCT No.: PCT/IB2018/052488
§ 371 (c)(1),
(2) Date: Oct. 10, 2019

(87) PCT Pub. No.: WO2018/189667
PCT Pub. Date: Oct. 18, 2018

(65) Prior Publication Data
US 2021/0124731 A1    Apr. 29, 2021

(30) Foreign Application Priority Data
Apr. 11, 2017    (GB) ..................................... 1705858

(51) Int. Cl.
G06F 16/00    (2019.01)
G06F 16/23    (2019.01)
(Continued)

(52) U.S. Cl.
CPC .......... G06F 16/2379 (2019.01); H04L 9/085 (2013.01); H04L 9/0852 (2013.01);
(Continued)

(58) Field of Classification Search
CPC .. G06F 16/2379; G06Q 20/02; G06Q 20/223; G06Q 20/0655; G06Q 40/12;
(Continued)

(56) References Cited

U.S. PATENT DOCUMENTS 9,398,018 B2 *  7/2016  MacGregor ............. H04L 67/10
10,050,779 B2    8/2018  Alness et al.
(Continued)

FOREIGN PATENT DOCUMENTS

CN    106549749 A    3/2017
WO    2015143068 A1    9/2015

OTHER PUBLICATIONS

Afr et al., "What is a Stealth Address?," Monero Stack Exchange, https://monero.stackexchange.com/questions/1500/what-is-a-stealth-address, Sep. 5, 2016 [retrieved Mar. 9, 2022], 4 pages.
(Continued)

*Primary Examiner* — Vincent F Boccio
(74) *Attorney, Agent, or Firm* — Davis Wright Tremaine LLP

(57) ABSTRACT

A computer-implemented method for transferring a total data record from an input node to an output node using a blockchain. The total data record may be a total payment, in some cases, such as using Bitcoin. The output node shares public key material and the input node selects unspent transaction outputs to use in paying the total value, and determines a plurality of outputs payable to the output node in fixed denominations. The input node generates an output address for each output using the public key material and a respective random number, and mixes the inputs and outputs in one or more coin mixing transactions. A nonce public key for each output, generated based on the respective random number, is shared with the output node either separately or through the blockchain, and the output node can derive the
(Continued)

corresponding private key for each output address, enabling it to search for and identify the outputs to which it can then claim ownership.

17 Claims, 6 Drawing Sheets

(51) Int. Cl.
  *H04L 9/08* (2006.01)
  *H04L 9/30* (2006.01)
  *G06Q 20/06* (2012.01)
  *G06Q 40/04* (2012.01)

(52) U.S. Cl.
  CPC .......... *H04L 9/30* (2013.01); *G06Q 20/0655* (2013.01); *G06Q 40/04* (2013.01); *G06Q 2220/00* (2013.01)

(58) Field of Classification Search
  CPC .... G06Q 40/02; G06Q 40/04; G06Q 2220/00; H04L 9/30; H04L 9/0852; H04L 9/085
  USPC ......................................................... 707/703
  See application file for complete search history.

(56) References Cited

U.S. PATENT DOCUMENTS

| | | | | |
|---|---|---|---|---|
| 10,423,961 | B1* | 9/2019 | El Defrawy | G06Q 20/065 |
| 2004/0172413 | A1* | 9/2004 | Shin | G06F 16/81 |
| 2015/0120569 | A1* | 4/2015 | Belshe | G06Q 20/3829 705/71 |
| 2015/0271183 | A1* | 9/2015 | MacGregor | H04L 67/1097 726/4 |
| 2015/0356523 | A1 | 12/2015 | Madden | |
| 2015/0356524 | A1* | 12/2015 | Pennanen | G06Q 20/367 705/71 |
| 2017/0048209 | A1 | 2/2017 | Lohe et al. | |
| 2017/0085555 | A1 | 3/2017 | Bisikalo et al. | |
| 2018/0089644 | A1* | 3/2018 | Chen | G06Q 20/26 |
| 2018/0253702 | A1* | 9/2018 | Dowding | H04L 9/0637 |

OTHER PUBLICATIONS

Antonopoulos, "Mastering Bitcoin—Unlocking Digital Cryptocurrencies," O'Reilly Media, Inc., Dec. 20, 2014, 282 pages.
Bissias et al., "Sybil-Resistant Mixing for Bitcoin," WPES '14 Proceedings of the 13th Workshop on Privacy in the Electronic Society, Nov. 3, 2014, 10 pages.
Chan et al., "Analyzing the Bitcoin Transaction Graph: A Look at Mixers and Traceability," Massachusetts Institute of Technology course 6.858: Computer Systems Security Fall 2013 Final Project, Dec. 13, 2013, 7 pages.
Fry, "Proposal for decentralized blockchain-based coinmixing," Nxt Forum, https://nxtforum.org/privacy/proposal-for-decentrailzed-blockchain-based-coinmixing/, Jun. 1, 2014 [retrieved Mar. 9, 2022], 3 pages.
International Search Report and Written Opinion dated Jun. 28, 2018, Patent Application No. PCT/IB2018/052488, 13 pages.
Nakamoto, "Bitcoin: A Peer-to-Peer Electronic Cash System," Bitcoin, Oct. 31, 2008, https://bitcoin.org/bitcoin.pdf, 9 pages.
Ruffing et al., "CoinShuffle: Practical Decentralized Coin Mixing for Bitcoin," European Symposium on Research in Computer Security, Sep. 7, 2014, Sep. 7, 2014 (revised Aug. 14, 2014), 21 pages.
Saberhagen, "CryptoNote v 2.0," retrieved from https://cryptonote.org/whitepaper.pdf, Oct. 17, 2013, 20 pages.
Satoshi et al., "Connection Limits," Bitcoin Forum, Aug. 9, 2010, https://bitcointalk.org/index.php?topic=741.0;prev_next=prev, 2 pages.
Selij et al., "CoinShuffle Anonymity in the Block Chain," retrieved from http://delaat.net/rp/2014-2015/p77/report.pdf, Jul. 20, 2015, 36 pages.
Todd, "[Bitcoin-development] Stealth Addresses," Linux Foundation, https://web.archive.org/web/20140319151510/http://sourceforge.net:80/p/bitcoin/mailman/message/31813471/, Jan. 6, 2014 (archived version Mar. 19, 2014) [retrieved Mar. 9, 2022], 4 pages.
UK Commercial Search Report dated Jun. 12, 2017, Patent Application No. GB510835.0, 7 pages.
UK IPO Search Report dated Sep. 25, 2017, Patent Application No. GB1705858.7, 6 pages.
Van Wirdum, "Stealth Transactions and Reusable Payment Codes: how Bitcoin Addresses Can be Hidden in Plain Sight," Bitcoin Magazine, Jul. 5, 2016, https://bitcoinmagazine.com/culture/stealth-transactions-and-reusable-payment-codes-how-bitcoin-addresses-can-be-hidden-in-plain-sight-1467743772, 4 pages.
Wang, "Onchain Conjoin," LinkedIn, Oct. 4, 2016, https://www.linkedin.com/pulse/onchain-coinjoin-xinxi-wang-phd, 5 pages.
Zindros, "Monero and Anonymous Altcoin," CoReLab (NTUA)—Athens Cryptography Days, 2016, http://corelab.ntua.gr/athecrypt2016/slides/Monero_zindros.pdf, 52 pages.

* cited by examiner

SYSTEM AND METHOD FOR DISTRIBUTING DATA RECORDS USING A BLOCKCHAIN

This invention relates generally to blockchain transactions and more particularly to methods and devices to generate and carry out a data record distribution transaction.

In this document we use the term 'blockchain' to include all forms of electronic, computer-based, distributed ledgers. These include, but are not limited to, blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its unlocking then locking scripts. If execution of the unlocking then locking scripts evaluates to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

One of the perceived advantages of blockchain technology, such as Bitcoin, is its anonymity and security. That is, the Bitcoin ledger does not contain any personal information about those participating in transactions; it only contains public address information. However, using external data and analytics it is possible to successfully associate specific transactions and addresses with an individual.

One of the drawbacks of some digital currencies, like Bitcoin, is that despite their popular reputation for privacy, the flow of bitcoins in the blockchain is fully public and can be analysed to trace the movement of value through the chain. This can lead to situations in which privacy is compromised. For example, if a person has a wallet that contains a large unspent transaction output, UTXO, such as a bi-weekly salary payment, and that unspent transaction output is used as the input to pay a small amount to another person, that other person and anyone else viewing the transaction will gain information about the wealth, and possibly the salary, of the person making the payment, partly based on the change being returned in the transaction. Other situations can arise where large inputs and/or a large change transaction can compromise the privacy of users.

Thus, it is desirable to provide for improved methods and devices that provide for heightened security and more robust cryptography through improved untraceability and unlinkability of inputs to outputs, while still producing an efficient and effective cryptocurrency payment mechanism.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications. Accordingly, the present application may refer to a "data record" being recorded with respect to a blockchain. The data record may include, for example, a document, a measure of processing power or time, a cryptocurrency quantity, a security or other token indicative of ownership of an asset, or other such things that may be controlled by an entity in possession of the cryptographic material that allows that entity to use or move that data record.

The potential traceability of records in the blockchain reveals an implementation flaw that may prejudice certain applications. Example applications include submitting exams or papers for marking, submitting anonymous crime reports, submitting anonymous survey or census returns, or other such applications in which groups of participant nodes need to securely and confidentially transfer a data record to one or more other nodes under circumstances where the data is unalterable after the submission. As with cryptocurrencies, the movement of other types of data records may be trackable based on characteristics of the records themselves, thereby allowing for tracing of submissions back to a particular node, which may compromise privacy or safety of a user of the node, or may undermine integrity of the anonymity of the distribution or submission process. Moreover, if nodes in the network are able to identify one node as the source for a transferred document to another node, then it increases the ability of those observer nodes to compromise security of the network through attacks, such as spoofing and other computer security attacks.

The public nature of the blockchain presents a technical challenge in structuring a data record distribution process, whether for cryptocurrency or any other type of data record, that more effectively ensures the security and integrity of the distribution process while minimizing the opportunities for tracking the transfer of data records between particular specific nodes.

Such an improved solution has now been devised.

Thus, in accordance with the present invention there are provided methods and devices as defined in the appended claims.

Advantageously, the present application provides an improved method, device and system for blockchain-based data record distribution that improves privacy and security of the transaction. Using a unique combination of stealth addressing, record distribution, and deconstruction of the records into prescribed data record characteristics, the total data record(s) is transferred while delinking the inputs from the outputs to protect against disclosure of information relating to either the input or output nodes and to hamper tracing activity.

The invention may provide a computer-implemented method and corresponding system. The method/system may be described as a blockchain-implemented method/system. The invention may be described as a security method or cryptographic method/system. It may provide for the secure transfer of a digital asset or data record such as a portion or quantity of cryptocurrency. Additionally or alternatively, it may provide a control mechanism for controlling the transfer of a digital asset such as a portion or quantity of cryptocurrency.

Additionally or alternatively, the present application may describe a computer-implemented method to transfer a total data record between an input node and an output node using a blockchain. The method, implemented at the input node, may include obtaining public key material associated with the output node; determining, based on the total data record and available data records controlled by the input node, one or more inputs selected from the available data records, wherein the cumulative total of the one or more inputs is equal to or greater than the total data record, and a plurality of outputs, each output being for a respective data record characteristic selected from a series of prescribed data record characteristics, and wherein the sum of the plurality of outputs matches the total data record; for each of the outputs, selecting a number at random, generating an output address based on the public key material and the random number, inserting the output address in a record distribution transaction to be allocated a data record having the respective data record characteristic of that output, generating a nonce public key from the random number, and sharing the nonce public key with the output node; and signing the one or more inputs.

Additionally or alternatively, the present application may describe a computer-implemented method to transfer a total data record between an input node and an output node using a blockchain. The method, implemented at the output node, may include providing, to the input node, public key material associated with the output node; obtaining a nonce public key from the input node; searching a blockchain for a data record distribution transaction, the data record distribution transaction having multiple input addresses and multiple output addresses, each output address being allocated a data record having a respective data record characteristic in a series of prescribed data record characteristics; determining a public-private key pair based on the nonce public key and the public key material; matching the public key from the public-private key pair with one of the output addresses in the data record distribution transaction and, based on that match, adding the data record allocated to that output address to an interim data record compilation; and determining whether the interim data record compilation is less than the total data record and, if so, continuing the searching, determining and matching until the interim data record compilation matches the total data record.

Additionally or alternatively, the present application may describe a computer-implemented method to transfer a total value between an input node and an output node using a blockchain. The method, implemented at the input node, may include obtaining public key material associated with the output node; determining, based on the total value and available unspent output transactions owned by the input node, one or more inputs selected from the unspent output transactions, wherein the cumulative value of the one or more inputs is equal to or greater than the total value, and a plurality of outputs, each output being for a respective denomination selected from a series of prescribed denominations, and wherein the sum of the plurality of outputs matches the total value. The method further includes, for each of the outputs, selecting a number at random, generating an output address based on the public key material and the random number, inserting the output address in a coin mixing transaction to be allocated the respective denomination of that output, generating a nonce public key from the random number, and sharing the nonce public key with the output node. The input node signs the one or more inputs.

In some implementations, determining the one or more inputs and the plurality of outputs is partly based on available coin mixing transactions. The available coin mixing transactions each involve mixing particular denominations. Determining the one or more inputs and the plurality of outputs is partly based on matching the value of each of the one or more inputs and the plurality of outputs to a respective one of the particular denominations.

In some implementations, inserting the output address, for the plurality of outputs, includes inserting all output addresses as outputs to a single coin mixing transaction structured to mix a plurality of different denominations. In some other implementations, inserting the output address, for the plurality of outputs, includes inserting at least one output address in a first coin mixing transaction, and at least another output address in a second coin mixing transaction, and the first coin mixing transaction is for mixing denominations different from the denominations mixed in the second coin mixing transaction.

In some implementations, the series of prescribed denominations is based on a maximum coin value and a series defined by $$\frac{1}{10^n}$$

times the maximum coin value, where n is a positive integer. Other series may be used in other implementations.

In some implementations, the public key material comprises two public keys, $BPub_x$ and $BPub_y$, and the output address for output i is given by:

$$BPub_i = H(r_i BPub_x)G + BPub_y$$

where G is an elliptic curve base point, H( ) is a hash function, and $r_i$ is the random number selected for output i. The nonce public key $R_i$ may be generated as $R_i = r_i G$.

In some implementations, sharing the nonce public key includes inserting the nonce public key in a non-transactional data field in the coin mixing transaction; inserting the nonce public key in a non-transactional data field in a separate transaction different form the coin mixing transaction; or sending the nonce public key to the output node in using a non-blockchain communication.

Additionally or alternatively, the present application may describe a method, implemented at the output node, that includes providing, to the input node, public key material associated with the output node; obtaining a nonce public key from the input node; and searching a blockchain for a coin mixing transaction, the coin mixing transaction having multiple input addresses and multiple output addresses, each output address being allocated a value conforming to a denomination in a series of prescribed denominations. The method further includes determining a public-private key pair based on the nonce public key and the public key material; matching the public key from the public-private key pair with one of the output addresses in the coin mixing transaction and, based on that match, adding the value allocated to that output address to a paid amount; and determining whether the paid amount is less than the total value and, if so, continuing the searching, determining and matching until the paid amount matches the total value.

In some implementations, the public key material comprises two public keys, $BPub_x$ and $BPub_y$, the two public keys having corresponding respective private keys, $BPriv_x$ and $BPriv_y$. Determining the $i^{th}$ public-private key pair may include determining:

$$BPriv_i = H(BPriv_x R_i) + BPriv_y$$

where $BPriv_i$ comprises the private key of the public-private key pair, $H( )$ is a hash function, and $R_i$ is the nonce public key, and wherein the public key of the $i^{th}$ public-private key pair is determined as $BPub_i = BPriv_i G$, wherein G is an elliptic curve base point.

In some implementations, searching the blockchain includes identifying coin mixing transactions containing a non-transactional code, and obtaining the nonce public key includes extracting the nonce public key from a non-transactional data field of the coin mixing transaction. In some other implementations, obtaining the nonce public key includes searching the blockchain for a transaction containing a non-transactional code and, when identified, extracting the nonce public key from a non-transaction data field in the transaction.

Yet other implementations described herein include computing devices having memory, processor(s) and executable instructions that, when executed, cause the processor to carry out the operations of one or more of the methods described herein.

Any feature described in relation to one aspect or embodiment of the invention may also be used in respect of one or more other aspects/embodiments. These and other aspects of the present invention will be apparent from, and elucidated with reference to, the embodiment described herein. An embodiment of the present invention will now be described, by way of example only, and with reference to the accompanying drawings, in which:

FIG. 1 illustrates an example blockchain network of nodes;

FIG. 2 diagrammatically illustrates one embodiment of a data record distribution process;

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

At times in the description below, reference will be made to a data record, which may include a data field containing a value. A total data record may, in some cases, be formed from a sum of the values of a plurality of data records. In some instances, the values may represent a digital asset or a quantity thereof, such as a cryptocurrency, but may also represent some other asset, such as computing resources, time, etc. References to data record characteristics may refer to an attribute of the data record. In some examples, this may include a value indicated in the data record, and a prescribed series of data record characteristics may include a series of prescribed values. The values may be integer or decimal values in some cases. In some instances, the values are representative of cryptocurrency amounts and may be referred to as denominations.

Figure 1:
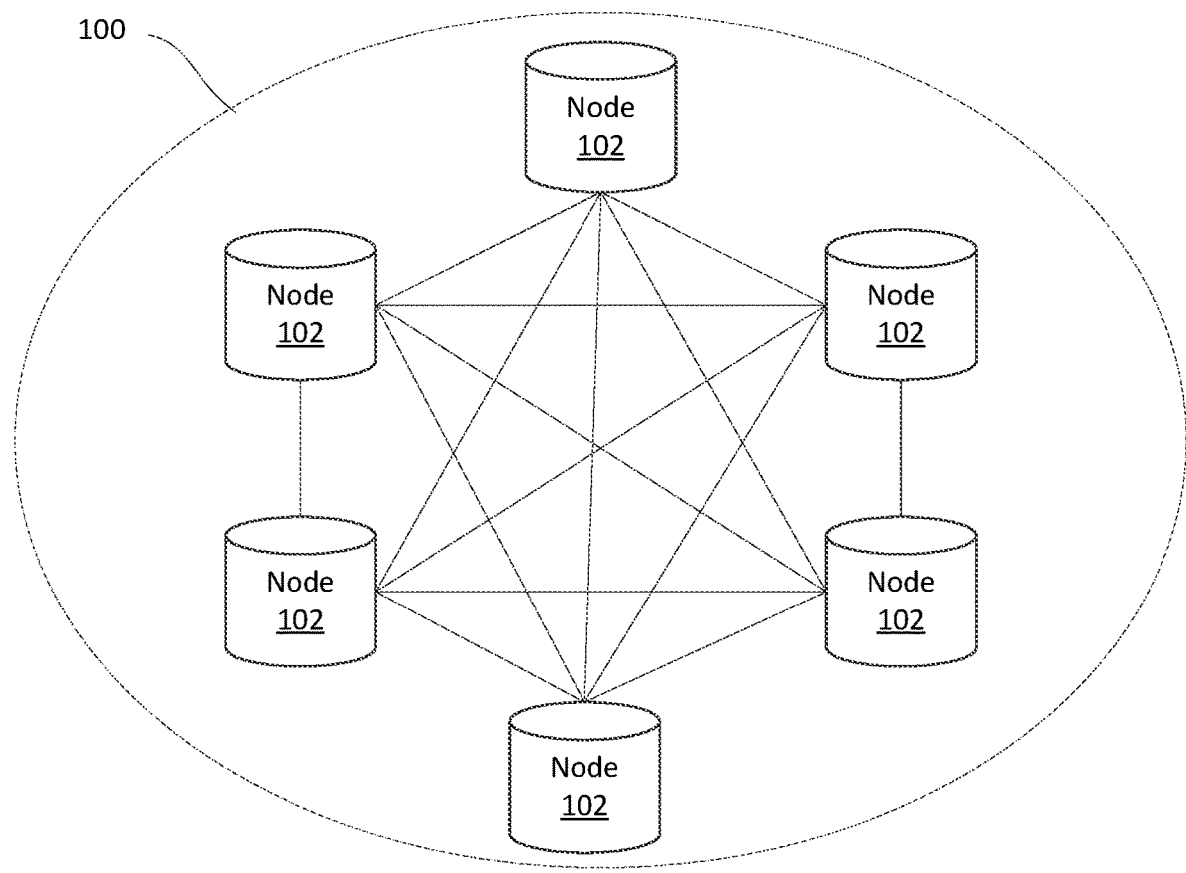

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction includes an address to which value is transferred as a result of the transaction. That value is then associated with that output address as an unspent transaction output (UTXO). A subsequent transaction may then reference that address as an input in order to spend or reallocate ownership of that value.

While the transactions are pseudo-anonymous in that no personal information is contained in the transactions on the blockchain ledger, it is possible to trace the transfer of data records in chains of transactions and, in some cases, to link a data record to an individual or particular node using external data. In order to increase security, a data record distribution transactions, for example a coin mixing transaction, may be used to pool inputs from a variety of sources and then to divide and allocate the pooled data records to outputs. If all the inputs and outputs are data records having the same characteristics, it is difficult to link a particular input with a particular output. However, in such transactions at least one participating node is aware of the linkage between an input address and output address specified by another participating node. In coin mixing transactions, such as a CoinJoin operation in the Bitcoin protocol, a single transaction having multiple inputs and multiple outputs is used to mix the values.

Some other techniques are used to try to avoid revealing links between an input and an output, such as stealth addresses, with varied effectiveness. Stealth addresses try to de-link the output address to which data records are sent from a particular output node so as to break traceability.

In accordance with the present application a method and device are described that facilitate the transfer of a total data record from an input node to an output node in a manner that increases the privacy and security of the distribution and provides impediments to linking the distribution to a particular input and/or output and for tracing the distribution or revealing associated information about the input node. Doing so within the structure of a blockchain protocol while ensuring security presents significant technical implementation challenges. The following description provides at least one embodiment of a solution to those technical implementation challenges.

In the description herein, the terms "input node", "output node", "participating node", "input address", and "output address" may be used. The reference to an "address" of a node is not meant to refer to a network address of a physical node. Instead the "address" is an address specified in a transaction on the blockchain having an unspent value to which the physical node can claim ownership by having a key that corresponds to a signature on the transaction. In this sense, the "output address" is not an address of the participating node, but is a blockchain transaction output address that is owned by or associated with the participating output node. Likewise, the "input address" is an address of an unspent transaction output (UTXO) that is owned by or associated with the participating input node.

Elliptic Curve Digital Signatures

Some blockchain technologies, like Bitcoin, use Elliptic Curve Digital Signature Algorithm (ECDSA) as the mathematical scheme for digital signing. ECDSA is a cryptographic digital signature used to ensure that value associated with a UTXO can only be spent by its rightful owner. Parameters required for ECDSA signatures include:

E—elliptic curve function
G—a base point on the elliptic curve with order n: $n \times G = 0$
n—a large prime number
q—subgroup order The key pair is generated from a random number x, where $0 < x < n$. The number x serves as the private key and the public key P is generated as $P = x \times G$.

Given a message m, random number k and private key x, a signature is produced with the pair (r,s). The random number k is selected such that $0 < k < q$. Then $r = k \times G$ is calculated and $s = k^{-1}(m + xr) \bmod n$ is calculated, where $k^{-1}$ is the multiplicative inverse of k mod n: $k^{-1}k \equiv \bmod n$. This gives the signature (r,s).

Given signature (r,s), message m and public key P, the signature may be verified. To verify the signature, $v = s^{-1} m \times G + s^{-1} rxy$ is calculated. In this expression, $s^{-1}$ is the multiplicative inverse of s mod q such that $s^{-1} s \equiv 1 \bmod n$. The signature is valid if $v = r$. Remember that G has order n, therefore the mod n part of $s^{-1}$ goes away when EC point is multiplied with G.

Pooled Decomposed Data Records

Figure 2:
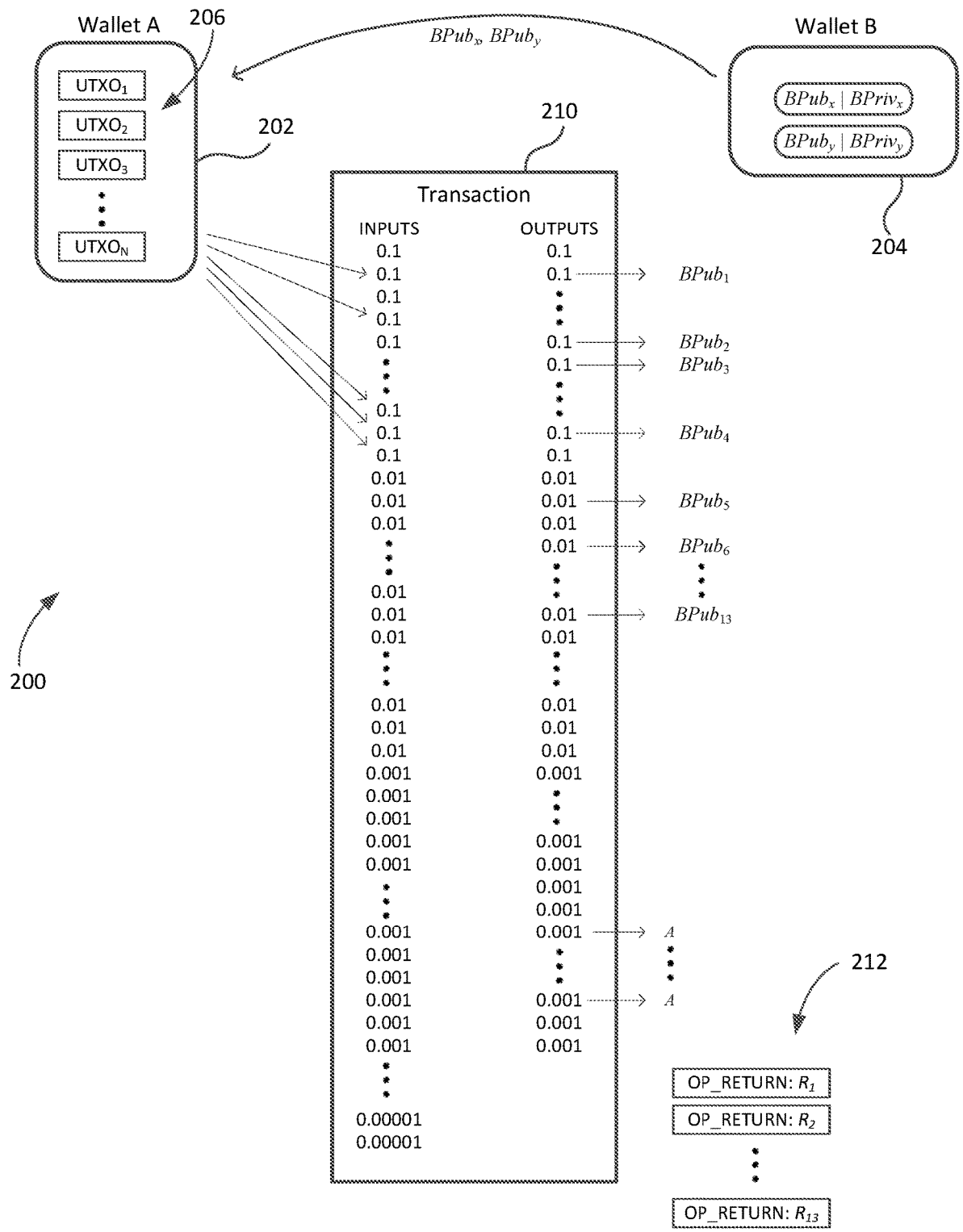

Reference is now made to FIG. 2, which diagrammatically illustrates one embodiment of a data record distribution process 200. In this example, the data records relate to a cryptocurrency and the total data record is a payment of a total value. An input node 202 is designated as "Wallet A". The input node 202 may be a lightweight node designed for making and receiving payments, but not a full node that stores a copy of the blockchain. In some cases, the input node 202 may be a full node, or even a mining node, but in the present example, the input node 202 is a lightweight node, which in many cases may be referred to as a "wallet". In the Bitcoin protocol, such nodes may be referred to as simplified payment verification (SPV) nodes. An output node 204 is designated as "Wallet B". As with the input node 202, in this example the output node 204 is a lightweight node. The nodes 202 and 204 may be referred to herein as participants or participating nodes.

The input node 202 "owns" (controls) a number of UTXOs of varying values, indicated by reference number 206. The input node 202 owns them in the sense that the input node 202 holds the private key corresponding to each UTXO 206 that enable the input node 202 to sign the script "spending" that UTXO 206 as an input to a blockchain transaction. Each UTXO 206 is the unspent output of a previous transaction sent or returned to the input node 202. The UTXOs 206 may be for varying amounts of value in the applicable cryptocurrency.

The output node 204 has two public-private key pairs, designated ($BPub_x$, $BPriv_x$) and ($BPub_y$, $BPriv_y$), where $BPub = BPriv G$. The output node 204 shares the public keys $BPub_x$ and $BPub_y$ with the input node 202, and possibly other nodes.

In this situation, the owner of the input node 202 intends to transfer a total value to the owner of the output node 204. The total value may reflect a payment for a good or service, in some implementations.

In accordance with an aspect of the present application, the input node 202 selects one or more of the UTXOs 206 to serve as inputs to a transaction effecting the payment. The cumulative value of the one or more UTXOs 206 is equal to or greater than the total value of the payment that is to be made to the output node 204. The selection of the UTXOs 206 may be based, in part, upon using a plurality of smaller denomination UTXOs 206 to make up the total value, rather than using one large UTXO 206 that will result in change, or at least that will result in significant change coming back to the input node 202.

In some implementations, the input node 202 may determine an optimal or advantageous plurality of UTXOs 206 using a greedy algorithm that produces a sum of inputs that is equal to or greater than the total value of the payment, while minimizing the number of UTXOs 206. Additional factors in the analysis may include minimizing the change generated, i.e. ensuring that the cumulative value of the UTXOs 206 selected exceeds the total value by a minimum amount possible given the available UTXOs 206. In some implementations, the UTXOs 206 may be prioritized based on their value; that is, as will be further explained below, UTXOs 206 that correspond in value to one of a predetermined series of dominations may be preferred.

In some implementations, the selection of an optimal set of UTXOs 206 can be based on the total value (or total value plus fees, since the input node 202 may need to ensure submitted inputs include enough to cover fees for the transaction(s)), and rules that avoid the use of large UTXOs 206 to make small payments. That is, the input node 202 may prioritize using UTXOs 206 that are smaller than the total payment. The input node 202 may implement the UTXO selection process using dynamic programming, a greedy algorithm, or any other suitable computer programming technique for finding a locally-optimal, or at least suitable, selection of UTXOs 206.

In accordance with another aspect of the present application, the transfer of value is to be made by way of one or more coin mixing transactions, like CoinJoin transactions in the Bitcoin protocol. That is, the selected UTXOs 206 are inputs to one or more coin mixing transactions.

The input node 202 further determines a plurality of outputs to compose the total payment. The cumulative value of the outputs matches the total value of the payment being made to the output node 204. Each output is determined to be for a respective denomination selected from a series of prescribed denominations. In one example, the denominations may be a prescribed series of fractions of the applicable cryptocurrency. In one example, the denominations may be given by the base unit of the cryptocurrency times $$\frac{1}{10^n},$$

where n=0, 1, 2, 3, etc. As an example, using Bitcoin, the denominations may be:

1 BTC, 0.1 BTC, 0.01 BTC, 0.001 BTC, . . . , to 1 satoshi.

Other example denominations may not necessarily be related by base-10, such as, for example, 1 BTC, 0.5 BTC, 0.2 BTC, 0.1 BTC, 0.05 BTC, 0.02 BTC, 0.001 BTC, . . . etc.

In some implementations, at least all-but-one of the inputs has a corresponding output of the same value (since, if the cumulative value of the inputs exceeds the total payment, one of the inputs may result in change being payable back to the input node and/or an excess amount attributable to the fee payable in the transaction). The inputs that match corresponding outputs in value may be included in the same coin mixing transaction, where the transaction is designed to mix a plurality of inputs and outputs all having the same value.

Once the input node 202 has determined the one or more UTXOs 206 to serve as inputs, and has determined the plurality of outputs and their respective values, the input node 202 joins one or more coin mixing transactions by inserting the UTXOs 206 as inputs and inserting a respective output address corresponding to each of the outputs.

In a further aspect of the present application, the input node 202 does not use the output node's public address(es) as the output address(es), and does not pool the outputs at a common address for the output node 204. Instead, the input node 202 generates a new secret output address for each output. Each new secret output address is generated based on the public keys $BPub_x$ and $BPub_y$ provided by the output node and a random number $r_i$. The random number $r_i$ may be referred to as a nonce. In this regard the two public keys from the output node 204 together act as a "stealth address", in that they will serve as seeds to generate the secret address, but the link between the output node 204 and the new secret address is known only to the input node 202. This shields the identity of the payee in the transaction since the actual output addresses are not known to be associated with the output node 204, whereas if a payment were made to the output node's 204 published public key address then it would be identifiably associated with the output node 204.

In this example, the input node 202 specifically generates the new secret output address, $BPub_i$, based on:

$$BPub_i = H(r_i BPub_x) G + BPub_y,$$

where G is the elliptic curve base point and H( ) is a hash function. The input node 202 also calculates a nonce public key $R_i$ from the random number $r_i$ based on $R_i = r_i G$.

The input node 202 generates a new secret output address $BPub_i$ for each output. It also shares the nonce public key $R_i$ for each output with the output node 204. The output node 204 then uses that nonce public key $R_i$ and the private keys $BPriv_x$ and $BPriv_y$ to try to generate the private key corresponding to one of the output addresses in the transaction, using the equation:

$$BPriv_i = H(BPriv_x R_i) + BPriv_y.$$

If the generated private key can be used to obtain the public key $BPub_i$, then the output node 204 has the correct private key to unlock the transaction output directed to that output address.

The mechanism for sharing the nonce public keys $R_i$ may take different forms depending on the implementation. In one implementation, the nonce public key $R_i$ is inserted in a non-transactional field of the coin mixing transaction in which the output address is used. The output node 204 searches the blockchain to find coin mixing transactions that have data in a non-transactional field. In the Bitcoin protocol, for example, the OP_RETURN code is a Script opcode used to mark invalid transaction output. Because any data placed after the OP_RETURN code is ignored in processing Bitcoin payments, it can effectively work as a message or data storage field within a transaction. Accordingly, in one implementation based on the Bitcoin protocol, the coin mixing transaction includes an output with an OP_RETURN code, or functional equivalent, followed by the public nonce key $R_i$. In generic terms, the code that indicates that non-transactional data or information is included in the transaction may be referred to herein as a "non-transactional code".

However, some protocols, like Bitcoin, may limit the ability to use this type of non-transactional data field in a transaction. As an example, Bitcoin may only permit one OP_RETURN code per transaction, meaning that only one $R_i$ may be specified in a coin mixing transaction. Although it may be possible to concatenate $R_i$ keys in a single non-transactional data field in some cases, in some embodiments restrictions on the field length and the size of the keys may make that impractical. Accordingly, the nonce public keys $R_i$ for the multiple outputs in a coin mixing transaction may be shared using another mechanism.

In one example embodiment, the input node 202 generates additional transactions, 212, each having a non-transactional data field to contain one of the $R_i$ nonce public keys. The number of additional transactions may match the number of outputs. The output node 204 then searches or monitors the blockchain for the presence of transactions that contain non-transactional data, such as an OP_RETURN code. If it finds such a transaction, it extracts the non-transactional data on the basis that it may be a nonce public key and uses that data together with its public key material to generate a possible output address. The output node 204 then assesses whether that generated possible output address appears as the output of a coin mixing transaction on the blockchain.

In another example implementation, the input node 202 transfers the nonce public keys $R_i$ to the output node 204 outside of the blockchain itself using a separate, preferably encrypted, communication channel. The output node 204 then generates the corresponding public keys $BPub_i$, and searches the blockchain for coin mixing transactions transferring value to those addresses.

In cases where the output node 204 is not directly given the nonce public keys but rather it searches the blockchain to find transactions containing non-transactional data and trying to identify corresponding outputs in coin mixing transactions, the output node 204 may continue that search until it has found a set of outputs that cumulatively add up to the total value that was to be transferred by the input node 202.

FIG. 2 shows one example in which the input node 202 is to transfer 0.49 coins. The coins may be Bitcoins, altcoins, or any other cryptocurrency. In this illustrative example, a coin mixing transaction 210 is available for the input node 202 to join and in which multiple denominations (in fixed prescribed denominations) are being mixed. That is, the transaction includes a plurality of 1 coin inputs and outputs, a plurality of 0.1 coin inputs and outputs, a plurality of 0.01 coin inputs and outputs, and a plurality of 0.001 coin inputs and outputs, and so on. Further denominations may be included, including non-base-10 denominations in other examples.

In this example, the input node 202 assembles the 0.49 coins using five available UTXOs 206 each in the amount of 0.1 coins. If the input node 202 did not happen to have sufficient UTXOs 206 in the 0.1 coin denomination, it would select different denomination UTXOs to compose the payment. In this example, where the input node 202 is inputting 0.5 coins to make a 0.49 coin payment, the input node 202 would entitled to change of 0.01 coins, but the transaction may involve a fee, as in this example. Change in the amount of 9×0.001 coins is returned to the input node 202, implying a transaction fee of 0.001 coins.

The five inputs each come from a different UTXO 206 owned by the input node 202. The outputs include 4×0.1 coins and 9×0.01 coins. In this example, the input node 202 generates 13 output addresses, indicated as $BPub_1$, $BPub_2$, ..., $BPub_{13}$.

The thirteen public nonce keys, $R_i$, i=1, 2, ... 13, are shared with the output node 204. As described above, in some protocols it may be possible to insert the keys into respective non-transactional data fields within the coin mixing transaction. The non-transactional data field is a data field of some type that will not negatively impact the transaction. The data field may be a designated field for comments, text, or any such data not relevant to the transaction. In some cases, the data field may be marked or specified by a specific code or signal to indicate that the field contains non-transactional data. As described above, in the Bitcoin protocol, OP_RETURN code may be used for this purpose; however, the Bitcoin protocol limits the use of non-transactional outputs such that all thirteen nonce public keys $R_i$ could not be inserted into the coin mixing transaction.

In cases where the nonce public keys $R_i$ cannot be shared within a non-transactional field in the coin mixing transaction itself, the input node 202 shares them in another manner. In one example, the input node 202 sends them to the output node 204 through a separate encrypted channel or communication. In another example, the input node 202 shares them through the blockchain by putting each nonce public key $R_i$ into a non-transactional data field of a respective transaction.

The output node 204 scans the blockchain looking for transactions that may include the payment from the input node 202. The searching may be based on identifying transactions that contain a particular signal or code signifying the presence of non-transactional data, which could potentially be the nonce public key(s). In one implementation, the signal detected is a non-transactional code, such as OP_RETURN (or its functional equivalent) in the Bitcoin protocol, which indicates that the data following the code is non-transactional. In this example, there are at least thirteen null outputs containing non-transactional data, either in the coin mixing transaction 210 itself or in a set of thirteen additional transactions 212. For each field, in turn, the output node 204 extracts the data (which it presumes could be a nonce public key $R_i$), calculates the $BPriv_i$ and the corresponding $BPub_i$ based on its $BPriv_x$ and $BPriv_y$, and the equation:

$$BPriv_i = H(BPriv_x, R_i) + BPriv_y$$

If the extracted data is one of the nonce public keys $R_i$ used by the input node 202 to generate the secret output address, then the output node 204 will have successfully generated a $BPub_i$ that matches one of the output addresses in the transaction 210. It may simply compare the calculated $BPub_i$ to the output addresses for the transaction 210 to validate that it has correctly identified one of the payments to it. Now that it has the corresponding private key, $BPriv_i$, the output node 204 owns that UTXO.

It will be appreciated that the example in FIG. 2 involves a transaction 210 that mixes a plurality of base-10 denominations in sufficient quantities that the input node 202 is able to find a combination of UTXOs 206 that cumulatively make up the payment and are able to join the transaction 210. In some situations, such a coin mixing transaction may not be available to join, or may not be successful in being completed.

It will also be appreciated that the example of FIG. 2, and in the discussion below, is specific to cryptocurrencies and the distribution of payments, whereas the described process and system are also applicable to distribution of data records (one example of which is a cryptocurrency value) on the basis of data record characteristics matching prescribed data record characteristics (one example of which is matching values to prescribed denominations).

Figure 3:
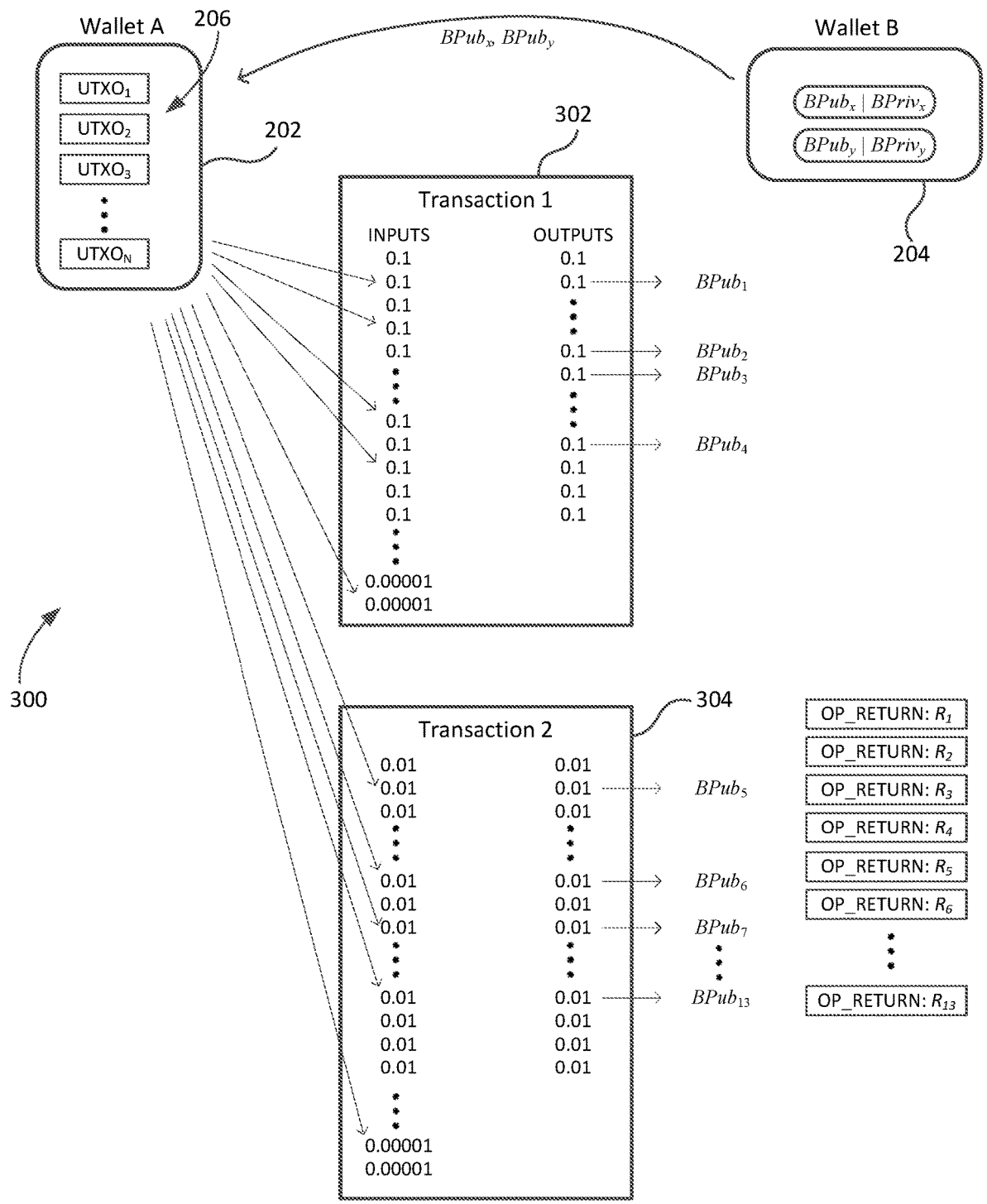
FIG. 3 shows, in flowchart form, an example process for data record distribution in a blockchain transaction.

FIG. 3 illustrates another example payment process 300 in which multiple coin mixing transactions 302, 304, are used.

In this example, the input node 202 is constrained in selecting available UTXOs 206 based on the available coin mixing transactions 302, 304. In this illustrative example, it is presumed that one coin mixing transaction 302 is for mixing 0.1 coin denominations, and the other coin mixing transaction 304 is for mixing 0.01 coin denominations. Participation in each of the transactions 302, 304 is subject to a transaction fee, in this example 0.00001 coins, which is input to the transaction by the input node 202 using discrete UTXOs 206 in that quantity, rather than relying on overpayment and change.

The input 202 node cannot use 5×0.1 coins as in the previous example, since the coin mixing transaction 302 is not necessarily designed so as to return change of 0.01 and the output payment to the output node 204 would result in an overpayment of 0.01 coins. Accordingly, the input node 202 may compose the payment using 4×0.1 coins mixed in transaction 302 and 9×0.01 coins mixed in transaction 304. The outputs would likewise be 4×0.1 coins from transaction 302 and 9×0.01 coins from transaction 304. The nonce public keys $R_1$, $R_2$, $R_3$, $R_4$, would be placed in non-transactional data fields in transaction 302 and the remaining nonce public keys $R_5$ to $R_{13}$ would be placed in non-transactional data field in transaction 304, if multiple non-transactional data fields are permitted in the specific implementation/protocol being used. Alternatively, the nonce public keys $R_i$ are shared with the output node 204 through a separate communication channel or are shared through separate individual blockchain transactions each containing one of the nonce public keys $R_i$ in a non-transactional data field.

It will be understood by those skilled in the art, that yet other example processes may use other denominations and coin mixing transactions to effect payments.

It will also be appreciated that to participate in the processes 200 and 300 described above, the input node 202 has available sufficient UTXOs 206 in the correct denominations. There may be circumstances in which the UTXOs 206 owned by an input node 202 are not in the correct denominations to participate in coin mixing at prescribed denominations. In one implementation, the input node 202 may be configured to signal to payors that it wishes to receive payments in prescribed denominations, so that it will have UTXOs available for payments it subsequently intends to make. In some cases, the input node 202 may be configured to proactively breakdown or decompose its UTXOs 206 into multiple UTXOs 206 having the prescribed denominations. Such functionality may be built into the wallet software, which may proactively generate transactions to decompose UTXOs 206 into prescribed denominations, provided such transactions can be implemented with negligible or zero transaction fees. In some instances, the wallet software may be configurable to enable or disable this functionality. If enabled, the wallet software may generate and execute these transactions in the background. In some implementations, the software may display proposed decomposition transactions for user approval prior to executing the transactions, particularly if any fees are payable for the decomposition transaction.

Figure 4:
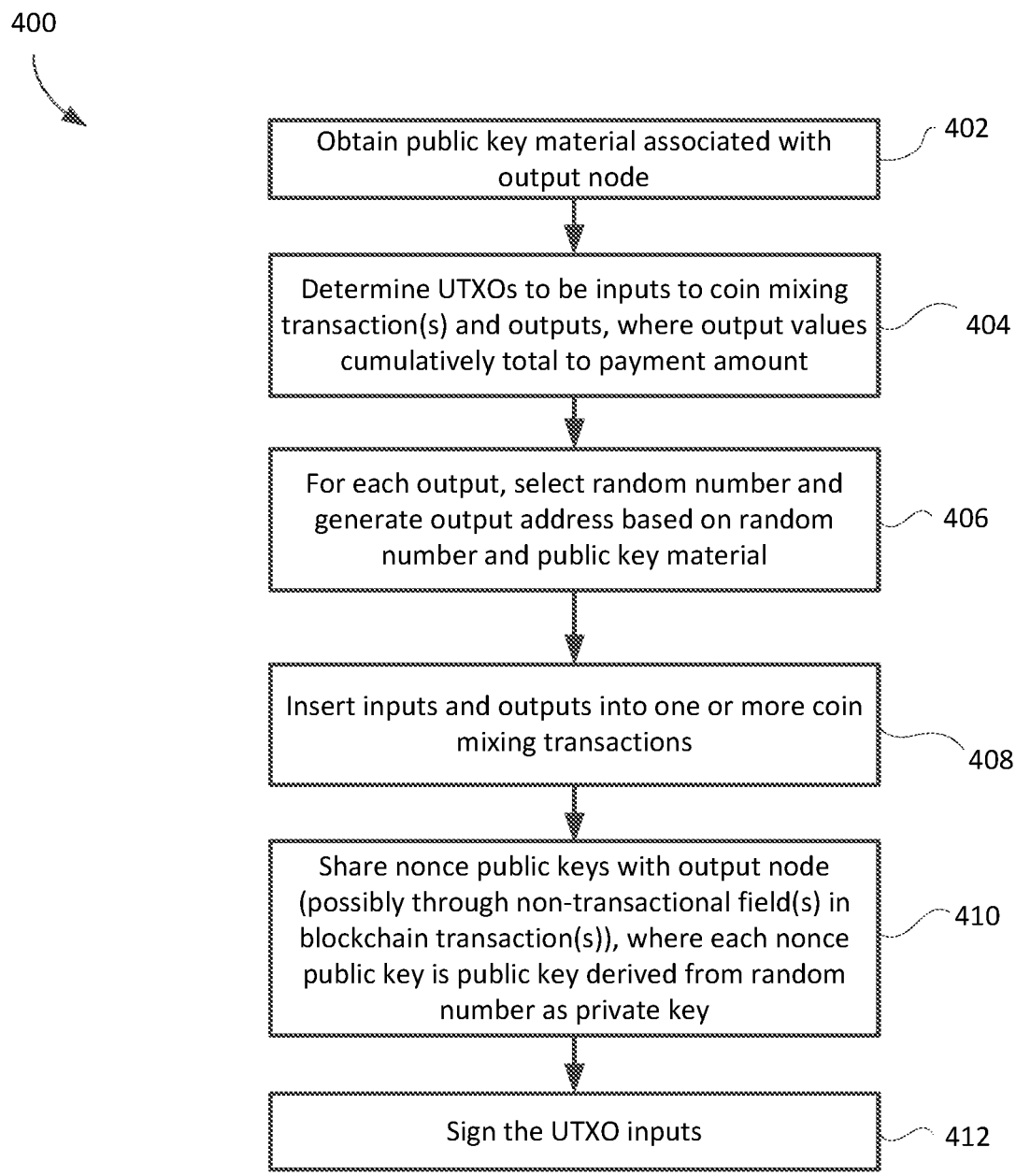
FIG. 4 shows, in flowchart form, an example process for participating as an input node in a data record distribution operation in accordance with an embodiment of the present application.

Reference will now be made to FIG. 4, which shows, in flowchart form, one example method 400 for making a blockchain-based payment from an input node to an output node in accordance with an aspect of the present application. The method 400 includes obtaining public key material from the output node in operation 402. In this example, the public key material includes $BPriv_x$ and $BPriv_y$, although in some other implementations the output node public key material may take a different form.

The input node then, in operation 404, selects UTXOs from its pool of available UTXOs to compose the payment to the output node. The UTXOs selected may be based on the denominations of available coin mixing transactions. The UTXOs selected may further be based on minimizing the number of UTXOs involved. The UTXOs selected may yet further be based on minimizing the change returned to the input node. Other factors may also be used in the selection process for identifying the UTXOs that will make up the payment. Although in many cases the payment may be composed of multiple UTXOs, in some cases, a single UTXO may be selected. The cumulative value of the UTXOs is equal to or greater than the total payment amount.

In operation 404, the input node also determines the number and denomination of the outputs that will compose the payment to the output node. The output denominations are selected from prescribed denominations, and may be selected based on the denominations of available coin mixing transactions.

In operation 406, having determined the number of outputs, the input node then selects a random number $r_i$ for each of the outputs and generates a $BPub_i$ output address for each output based on its associated random number $r_i$ and the public key material from the output node.

The input node then inserts the inputs and outputs into one or more coin mixing transactions in operation 408.

In operation 410, the input node shares the nonce public keys $R_i$ with the output node. Each nonce public key $R_i$ corresponds to a respective one of the random numbers $r_i$ used in generating the respective output addresses $BPub_i$. In some implementations, the nonce public keys $R_i$ are inserted into one or more non-transactional data fields in the coin mixing transaction(s). In some implementations, the nonce public keys $R_i$ are inserted in non-transactional data fields in separate additional transactions; up to one transaction for each nonce public key $R_i$. In yet other implementations, the input nodes shares the nonce public keys $R_i$ with the output node via a separate communications channel outside of the blockchain protocol.

The input node then signs each of the inputs it has inserted into the one or more transactions in operation 412.

Figure 5:
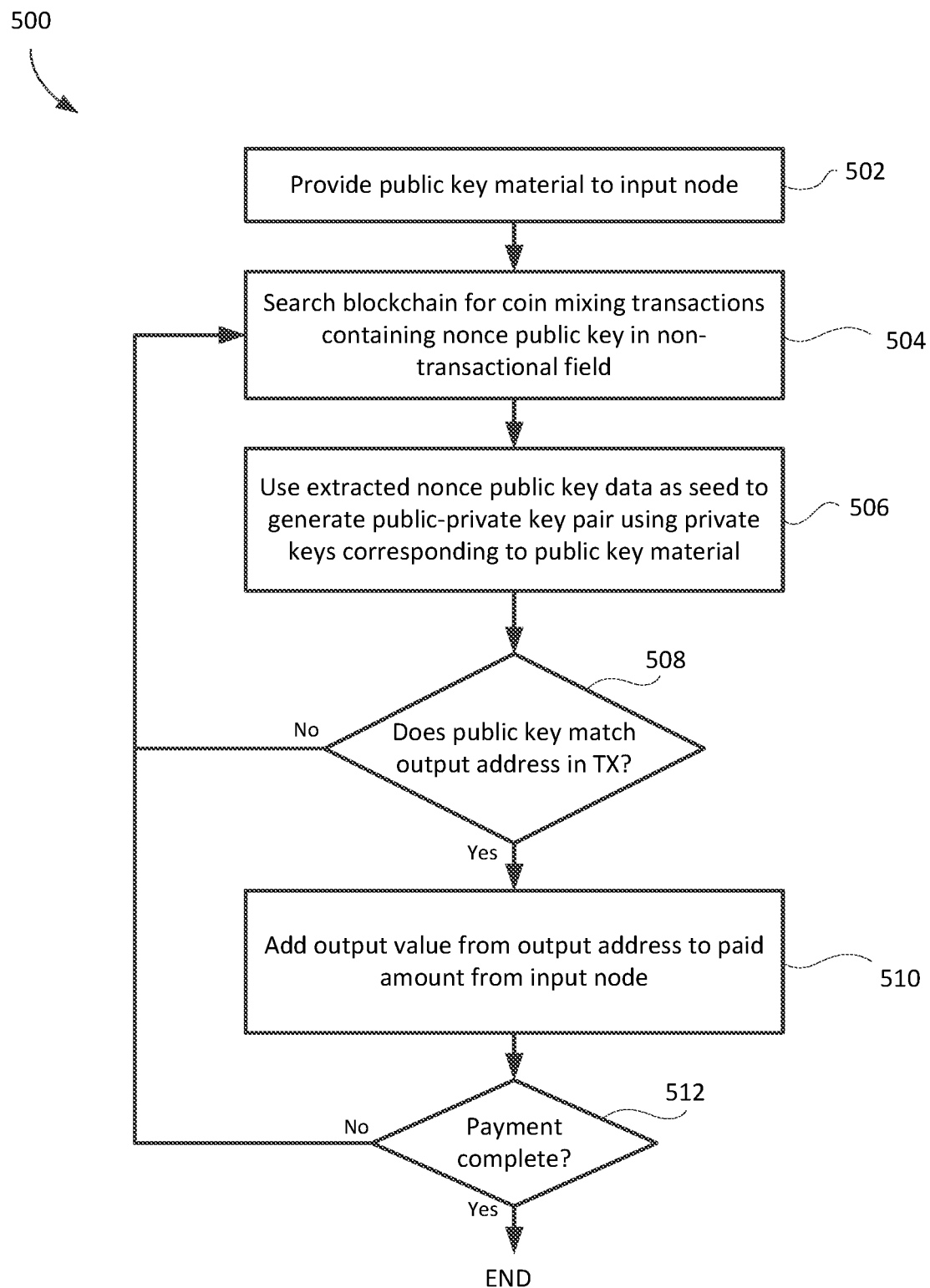
FIG. 5 shows, in flowchart form, an example process for participating as an input node in a data record distribution operation in accordance with an embodiment of the present application.

FIG. 5 shows, in flowchart form, one example method 500 for receiving payment at an output node using blockchain technology. The output node first publishes or makes available its public key material in operation 502. In this example method 500, the public key material is the two public keys: $BPub_x$ and $BPub_y$. It may provide this material to an input node that intends to make a payment to the output node. In this example, it is presumed that the output node is aware of the coming payment and the amount of the payment. However, there may be cases in which the output node has published its public key material generally and may receive payments from any number of possible sources in amounts it does not know in advance. In such cases, the output node intermittently scans the blockchain for non-transactional data and tests any such data found, as described below.

In operation 504, the output node begins searching the blockchain for transactions that may relate to the payment from the input node. In particular, the output node searches for transactions that contain a non-transactional signal or code indicating the presence of non-transactional data. In some embodiments, the output node may limit its search to coin mixing transactions containing non-transactional data. It will be appreciated that this example presumes that the non-transactional data is included in the coin mixing transaction itself. As discussed above, in some implementations that may not be possible and the nonce public key material may be shared with the output node in another manner, such as through additional transactions containing non-transactional data fields or through a separate non-blockchain communication channel. For example, if the nonce public keys are each in separate transactions, the output node may search for transactions containing one P2PKH output and one Null Data output.

In operation 506, having identified a candidate transaction that contains non-transactional data, the output node extracts the non-transactional data and tests whether the data can be used to generate one of the output addresses in the transaction. As described above, if the non-transactional data is the nonce public key $R_i$ then using its public key material the output node will be able to generate the public-private key pair $BPriv_i$ and $BPub_i$, and the generated public key $BPub_i$ will match one of the output addresses. In operation 508, the output node assesses whether the generated key matches an output address in the transaction. If not, it discards the non-transactional data and returns to searching the blockchain or, if there is additional non-transactional data in the current candidate transaction, testing the additional non-transactional data.

If the output node determines in operation 508 that it has successfully identified one of the payments by determining $BPriv_i$ and $BPub_i$, then it proceeds to add that payment allocated to $BPub_i$ to a total amount paid by the input node, as indicated by operation 510. In operation 512, the output node may assess whether the cumulative value of the payments from the input node have completed the total payment. If not, it continues searching.

It will be appreciated that some of the described operations in the above example embodiment may occur contemporaneously or in a different order in some implementations without materially impacting the processes. The present application encompasses those variations and modifications.

The coin mixing transactions may be run from a central server in some implementations. However, they may also be fully distributed where all input nodes act as blind-signing servers. In the context of Bitcoin, JoinMarket is an example of a decentralized implementation of coin mixing that incentivises participation and increases liquidity.

Figure 6:
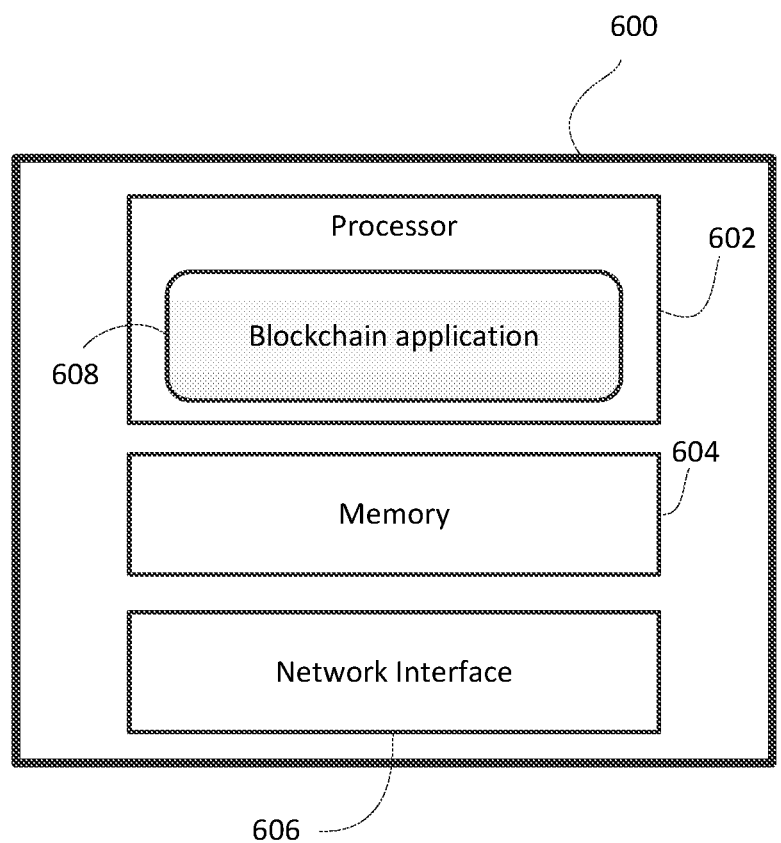
FIG. 6 shows a block diagram of a simplified participating node.

Reference will now be made to FIG. 6, which shows, in block diagram form, a simplified example of a participating node 600. The node 600 may be an input node or an output node. The node 600 includes a processor 602, which may include one or more microprocessors, application specific integrated circuits (ASIC s), microcontrollers, or similar computer processing devices. The node 600 further includes memory 604, which may include persistent and non-persistent memory, to store values, variables, and in some instances processor-executable program instructions, and a network interface 606 to provide network connectivity over wired or wireless networks.

The node 600 includes a processor-executable blockchain application 608 containing processor-executable instructions that, when executed, cause the processor 602 to carry out one or more of the functions or operations described herein.

It will be understood that the devices and processes described herein and any module, routine, process, thread, application, or other software component implementing the described method/process for configuring the node may be realized using standard computer programming techniques and languages. The present application is not limited to particular processors, computer languages, computer programming conventions, data structures, other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method to transfer a total data record represented by a total value between an input node and an output node using a blockchain, the method comprising:
   obtaining, at the input node, public key material associated with the output node, wherein the public key material comprises first and second public keys;
   determining, based on the total data record and available data records controlled by the input node, one or more inputs selected from the available data records, wherein a cumulative total of the one or more inputs is equal to or greater than the total data record, pooling inputs from a variety of sources;
   determining a number and denomination of a plurality of outputs that will compose a payment to the output node;
   dividing and allocating the one or more inputs to the outputs, thereby mixing transactions,
   and
   each output in the plurality of outputs being for a respective data record characteristic selected from a series of prescribed data record characteristics, and wherein a sum of the plurality of outputs matches the total data record;
   for each of the outputs:
     selecting a number at random;
     generating an output address based on the first and second public keys and the number selected at random;
     inserting the output address in a record distribution transaction to be allocated a data record having a respective data record characteristic of that output;
     generating a nonce public key from the number selected at random; and
     sharing the nonce public key with the output node; and
   signing the one or more inputs.

2. The method claimed in claim 1, wherein the determining said one or more inputs and said plurality of outputs is partly based on available data record distribution transactions.

3. The method claimed in claim 2, wherein the available data record distribution transactions each involve distributing data records having one or more particular data record characteristics, and wherein the determining said one or more inputs and said plurality of outputs is partly based on matching the data records of each of said one or more inputs and said plurality of outputs on the basis of a respective one of the particular data record characteristics.

4. The method claimed in claim 1, wherein inserting the output address, for said plurality of outputs, includes inserting all output addresses as outputs to a single data record distribution transaction structured to distribute a plurality of data records having different data record characteristics.

5. The method claimed in claim 1, wherein inserting the output address, for said plurality of outputs, includes inserting at least one output address in a first data record distribution transaction, and at least another output address in a second data record distribution transaction, and wherein the first data record distribution transaction is for distributing data records having data record characteristics different from the data record characteristics of the data records distributed in the second data record distribution transaction.

6. The method claimed in claim 1, wherein the data record characteristic is a value specified in the data record, and the series of prescribed data record characteristics is a series of values based on a maximum value and a series defined by $$\frac{1}{10^n}$$

times the maximum value, where n is a positive integer.

7. The method claimed in claim 1, wherein the first and second public keys comprise two public keys, $BPub_x$ and $BPub_y$, and wherein the output address for output i is given by:

$$BPub_i = H(r_i BPub_x)G + BPub_y$$

where G is an elliptic curve base point, H( ) is a hash function, and $r_i$ is the number selected at random selected for output i.

8. The method claimed in claim 7, wherein the nonce public key is a nonce public key $R_i$ that is generated as $R_i = r_i G$.

9. The method claimed in claim 1, wherein sharing the nonce public key comprises one of:
   inserting the nonce public key in a non-transactional data field in a data record distribution transaction;
   inserting the nonce public key in a non-transactional data field in a separate transaction different from the data record distribution transaction; or
   sending the nonce public key to the output node in using a non-blockchain communication.

10. A computing device to transfer a total data record between an input node and an output node using a blockchain, the computing device being one of the input node or the output node, the computing device comprising:
   a processor;
   memory;
   a network interface to provide network connectivity; and
   a blockchain application containing computer-executable instructions that, when executed by the processor, cause the processor to carry out the method claimed in claim 1.

11. A non-transitory processor-readable medium storing processor-executable instructions to transfer a total data record between an input node and an output node using a blockchain, wherein the processor-executable instructions, when executed by a processor in one of the input node or the output node, cause the processor to carry out the method claimed in claim 1.

12. A computer-implemented method to transfer a total data record between an input node and an output node using a blockchain, wherein the total data record is represented by a payment of a total data value, the method, implemented at the output node, comprising:
   providing, to the input node, public key material associated with the output node, wherein the public key material comprises first and second public keys;
   obtaining a nonce public key from the input node;
   searching a blockchain for a data record distribution transaction, the data record distribution transaction having multiple input addresses and multiple output addresses, wherein the input addresses are pooled from a variety of sources, each output address being allocated a data record having a respective data record characteristic in a series of prescribed data record characteristics;
   determining a public-private key pair based on the nonce public key and the public key material;
   matching a public key from the public-private key pair with one of the output addresses in the data record distribution transaction and, based on that match, adding the data record allocated to that output address to an interim data record compilation; and
   determining whether the interim data record compilation is less than the total data record and, if so, continuing the searching, determining, and matching until the interim data record compilation matches the total data record.

13. The method claimed in claim 12, wherein determining the public-private key pair comprises determining:
   $BPriv_i = H(BPriv_x R_i) + BPriv_y$ for an $i^{th}$ public-private key pair,
   where $BPriv_i$ comprises a private key of the public-private key pair, H( ) is a hash function, and $R_i$ is the nonce public key, and wherein the public key of the $i^{th}$ public-private key pair is determined as $BPub_i = BPriv_i G$, wherein G is an elliptic curve base point.

14. The method claimed in claim 12, wherein searching the blockchain comprises identifying data record distribution transactions containing a non-transactional code, and wherein obtaining the nonce public key comprises extracting the nonce public key from a non-transactional data field of the data record distribution transaction.

15. The method claimed in claim 12, wherein obtaining the nonce public key comprises searching the blockchain for a transaction containing a non-transactional code and, when identified, extracting the nonce public key from a non-transactional data field in the transaction.

16. A computing device to transfer a total data record between an input node and an output node using a blockchain, the computing device being one of the input node or the output node, the computing device comprising:
   a processor;
   memory;
   a network interface to provide network connectivity; and
   a blockchain application containing computer-executable instructions that, when executed by the processor, cause the processor to carry out the method claimed in claim 12.

17. A non-transitory processor-readable medium storing processor-executable instructions to transfer a total data record between an input node and an output node using a blockchain, wherein the processor-executable instructions, when executed by a processor in one of the input node or the output node, cause the processor to carry out the method claimed in claim 12.

* * * * *